US006348901B1

(12) United States Patent
Van Den Berghe

(10) Patent No.: US 6,348,901 B1
(45) Date of Patent: Feb. 19, 2002

(54) SURFACE REFLECTING ELECTROMAGNETIC WAVES AND PROCESS FOR PRODUCING IT

(75) Inventor: Jean-Louis Van Den Berghe, Flins sur Seine (FR)

(73) Assignee: Aerospatiale Matra Lanceurs Strategiques et Spatiaux, Paris (FR)

( * ) Notice: Subject to any disclaimer, the term of this patent is extended or adjusted under 35 U.S.C. 154(b) by 0 days.

(21) Appl. No.: 09/566,022

(22) Filed: May 8, 2000

(30) Foreign Application Priority Data

May 10, 1999 (FR) ........................................... 99 05901

(51) Int. Cl.[7] ................................................ B29G 5/00

(52) U.S. Cl. ....................... 343/912; 343/897; 427/431

(58) Field of Search ................................ 343/897, 912, 343/915, 909, 840; 156/242; 427/431

(56) References Cited

U.S. PATENT DOCUMENTS 4,191,604 A * 3/1980 MacTurk .................... 156/245
4,526,817 A * 7/1985 Rausch et al. .............. 427/431
4,609,923 A 9/1986 Boan et al. ................. 343/897
4,926,910 A 5/1990 Wade ..................... 139/425 R
5,771,027 A 6/1998 Marks et al. ............... 343/912

FOREIGN PATENT DOCUMENTS

| | | | |
|---|---|---|---|
| FR | 2 275 359 | 1/1976 | ............ B63H/9/06 |
| GB | 2 256 529 A | 12/1992 | .......... H01Q/15/14 |

OTHER PUBLICATIONS

French Search Report dated Dec. 7, 1999, 3 pages.

* cited by examiner

*Primary Examiner*—Don Wong
*Assistant Examiner*—James Clinger
(74) *Attorney, Agent, or Firm*—Marshall, Gerstein, & Borun

(57) ABSTRACT

The present invention relates to a rigid surface reflecting electromagnetic waves, especially for antenna reflectors, electromagnetic shielding, and waveguides.

According to the invention, this surface consists of an interlacement (7) of electrically conducting wires (2, 3) which consist, on the surface, of a stable metal diffusion alloy ensuring that said wires are fastened together and that said surface is rigidified.

8 Claims, 4 Drawing Sheets

SURFACE REFLECTING ELECTROMAGNETIC WAVES AND PROCESS FOR PRODUCING IT

The present invention relates to surfaces reflecting electromagnetic waves, such as antenna reflectors, electromagnetic shielding, waveguides, etc., as well as to a process for producing these surfaces.

Surfaces reflecting electromagnetic waves—hereafter called reflective surfaces—are already known which are produced from sheets of metal shaped, for example by drawing, so as to give them a self-supporting structure. However, such surfaces have a large mass so that they are generally limited in size. In addition, because of their mass, they cannot be mounted on board spacecraft.

Therefore, in order to remedy these mass and size-limitation drawbacks it has already been proposed to produce reflective surfaces by metallizing, using any known method (spraying, electroplating, vacuum deposition, conductive paint, etc.), supports made of a composite comprising carbon fibers and a cured-resin matrix. It is thus possible to obtain reflective surfaces of acceptable mass and of the desired size. However, these reflective surfaces have drawbacks. Firstly, it is found that the rectilinear portions of the carbon fibers of said supports introduce an undesirable parasitic polarization in the electromagnetic radiation reflected by said surfaces. This is due to the fact that the carbon fibers partly reflect the incident electromagnetic radiation while the cured resin of the matrix, lying between said fibers, is relatively transparent to said radiation.

In addition, local parasitic electrical discharges may occur between the facing ends of broken carbon fibers—these fibers being conductive—thereby generating interference in said reflected radiation.

Finally, the metallization of said composite supports generally has a surface finish so smooth that the thermal radiation received by such a reflector is concentrated onto the focus of the latter. Thus, when the source of the reflector lies at the focus it is necessary to thermally protect said source, for example by covering the active surface of the reflector with a diffusing paint.

The object of the present invention is to remedy the drawbacks of reflective surfaces based on a composite support, while still making it possible to obtain reflective surfaces of comparable lightness.

For this purpose, according to the invention, the rigid surface reflecting electromagnetic waves, especially for antenna reflectors, electromagnetic shielding and waveguides, is noteworthy in that it consists of an interlacement of electrically conducting wires which consist, on the surface, of a stable metal diffusion alloy ensuring that said wires are fastened together and that said surface is rigidified.

Thus, by virtue of the present invention, the carbon fibers and their drawbacks (parasitic polarization and fracture-induced discharges) are eliminated. Moreover, since in said interlacement the conducting wires are crossed, forming microfacets, the surface, when it is present in the form of an antenna reflector, no longer focuses the thermal energy just onto the focus; on the contrary, this thermal energy passes via a focal spot. As a result, the source is exposed to a smaller heat flux and the thermal protection of the source and of the reflector may be less complex. It is no longer necessary to cover the active surface of the reflector with a diffusing paint, thereby avoiding the distortions generated by the latter.

To obtain the rigid reflective surface according to the present invention, it is possible:

to produce a flexible interlacement of electrically conducting wires, the surface of which is metallic and coated with a filler metal, said filler metal having a melting point below that of the surface metal of said wires, and both said filler metal and said surface metal being able to diffuse mutually one into the other when they are heated to a temperature at least equal to the melting point of said filler metal in order to form a stable metal diffusion alloy, the melting temperature of which is above the melting point of said filler metal and increases toward the melting point of said surface metal with the intensity of said diffusion;

to shape said flexible interlacement to the shape desired for said rigid surface reflecting electromagnetic waves; and to raise the temperature of said flexible interlacement, thus shaped, beyond the melting point of said filler metal in order to form said metal diffusion alloy, causing said wires to be fastened together and resulting in the rigidification of said interlacement, which then forms said rigid surface.

This flexible interlacement may be produced in various ways, for example by knitting, whipping, braiding, lapping or weaving or else by the use of methods for manufacturing nonwoven fibrous products. However, an interlacement in the form of a knit has proved to be particularly advantageous, especially with regard to the diffusion of the heat flux received by said reflective surface.

The electrically conducting wires may consist of a metal core covered with said filler metal. In this case, the surface metal is therefore that of the core. However, as a variant, the electrically conducting wires may consist of a plurality of coaxial layers, at least some of which are made of a material—which is electrically conducting or possibly insulating—different from said surface metal.

Among the metals used for producing the electrically conducting wires, mention may be made of metals that are good electrical conductors, such as gold, silver, copper, etc., or else alloys having a low thermal expansion coefficient, such as certain ferro-nickel alloys, or else other metals or metal alloys.

The filler metals are chosen from low-melting-point metals or alloys, such as tin or indium, which are capable of forming a stable alloy with the surface metal by diffusion.

Excellent results have been obtained by choosing copper as the surface metal and indium as the filler metal.

The cross section of the electrically conducting wires may be circular, with a diameter of preferably between 6 and 20 microns, or else flattened, with a thickness of, again, preferably between 6 and 20 microns and a width of preferably between 0.2 and 1.5 mm. In these cases, the thickness of the coating of the filler metal may be between 10 ångströms and 1 micron.

In order to give said surface a desired thickness, it is preferable to apply uniform pressure to the shaped flexible interlacement during the temperature rise.

The surface according to the present invention may be uniform, with no holes. In this case, a relatively close interlacement is provided and the application of said uniform pressure makes it possible to close off any openings in the interlacement. As a variant, said surface may include holes, provided at the time of producing said interlacement.

In a preferred embodiment, the surface obtained by the rigidified interlacement is reinforced by a reinforcement placed against one of the faces of said interlacement and fastened to said face. Thus, the rigidified interlacement in this case forms only the active reflective part of said surface.

Such a reinforcement may have a fiber/cured-matrix composite structure. It is then advantageous for the surface and the reinforcement to be fastened together by adhesive bonding using the resin of said matrix, the reinforcement being formed on said surface. Of course, for this purpose the cure temperature of the resin must be less than the melting temperature of the stable metal diffusion alloy.

Thus it may be seen that, by virtue of the invention, a surface reflecting electromagnetic waves is obtained by diffusion soldering of the electrically conducting wires of the interlacement.

What are obtained by implementing the present invention are, inter alia, antenna reflectors able to operate at frequencies of bets en 18 GHz and more than 45 GHz.

The figures of the appended drawing will make it clearly understood how the invention may be realized. In these figures, identical references denote similar elements.

Figure 1:
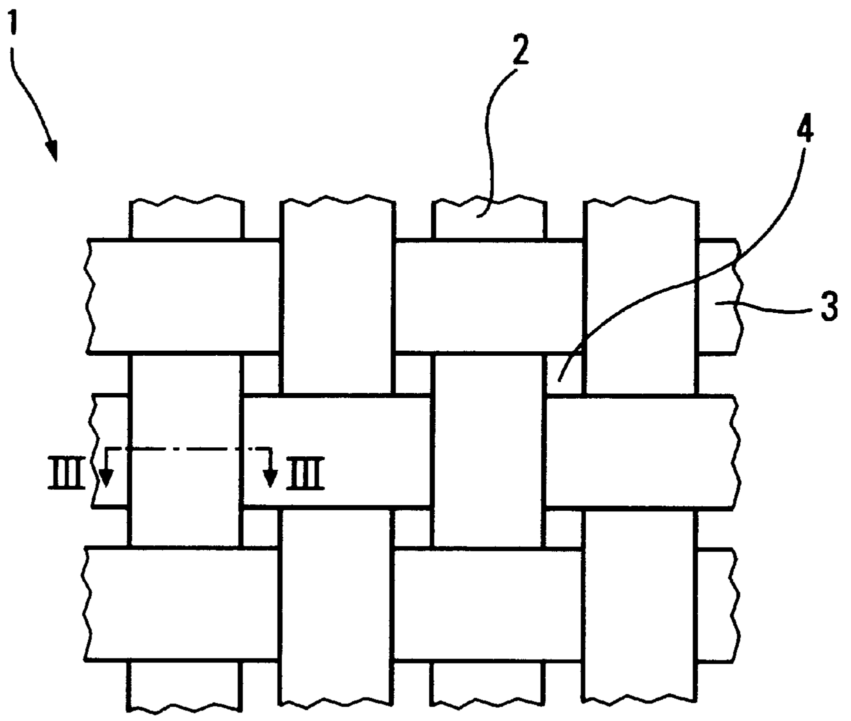
FIG. 1 shows, in plan, an example of an interlacement of electrically conducting wires which is used for implementing the present invention.

FIG. 1 shows an interlacement 1 of intersecting electrically conducting wires 2 and 3. In this FIG. 1, the interlacement 1 has for the purposes of simplifying the drawing been shown in the form of a weave comprising warp wires 2 and filling or weft wires 3, although the interlacement 1 could advantageously consist of knitted mesh.

It will be noted that, in the interlacement 1 in FIG. 1, the electrically conducting wires 2 and 3 leave gaps 4 between them.

Figure 3:
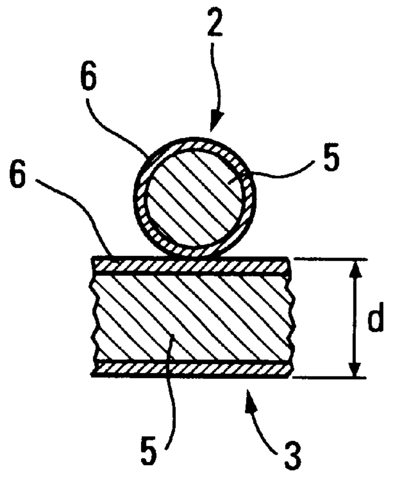
FIGS. 3 and 4 are sections on the lines III—III and IV—IV in FIGS. 1 and 2, respectively.
Figure 4:
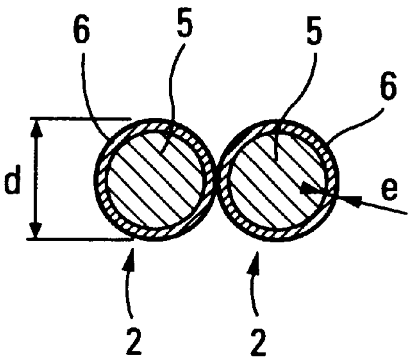

As may be seen in FIGS. 3 and 4, each wire 2 and 3 comprises a core 5, for example a copper core, coated on the surface with a coating 6 made of a low-melting-point metal, such as indium. The diameter d of the wires 2 and 3 may preferably be between 6 and 20 microns, while the thickness e of the coating 6 may be between 10 ångströms and 1 micron.

Figure 2:
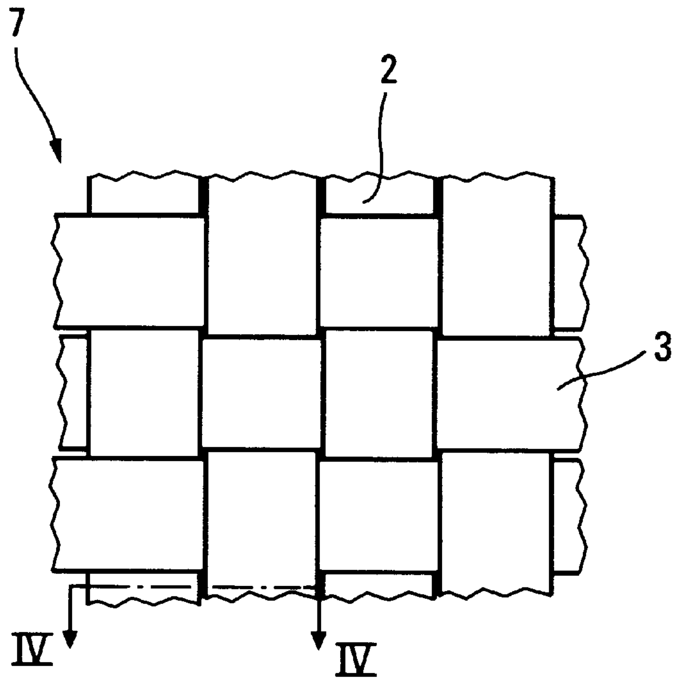
FIG. 2 shows, again in plan, a variant of the interlacement in FIG. 1.

In the embodiment in FIG. 2, the interlacement 7 is similar to the interlacement 1 in FIG. 1, except that the warp and weft conducting wires 2 and 3 are woven more closely so as to virtually eliminate the gaps 4.

It is known that when they are heated to a temperature at least equal to the melting point of indium, the indium and the copper diffuse, one into the other, in order to form a stable diffusion alloy whose melting point is between that of indium and that of copper and is all the higher the higher the temperature to which the copper and the indium are subjected.

It may therefore be readily imagined that, if the interlacements 1 and 7 are subjected to a temperature rise beyond the melting point of indium, while being subjected to a uniform pressure, the conducting wires 2 and 3 in contact with one another will result in the surface formation of a stable indium-copper diffusion alloy.

FIG. 3 illustrates the contact between the wires 2 and 3 at one of their points of intersection, while FIG. 4 illustrates the contact between two parallel wires 2 and 3.

After this stable alloy has been formed, the wires 2 and 3 of the interlacements 1 and 7 are fastened together, thereby rigidifying said interlacements, of course, if during the temperature rise the interlacements 1 and 7 are shaped to desired shapes for the rigidified interlacements, the rigidification will fix the definitive shape of said interlacements.

Figure 5:
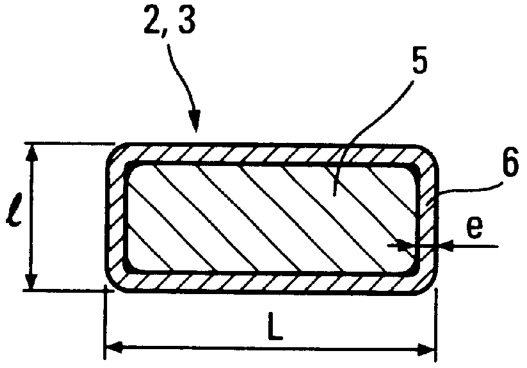
FIGS. 5 and 6 illustrate, in section, alternative embodiments of the conducting wires used to form the interlacements in FIGS. 1 and 2.
Figure 6:
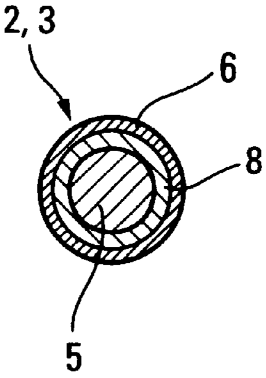

In FIGS. 3 and 4 it has been assumed that the wires 2 and 3 had a circular cross section. As may be seen in FIG. 5, said wires could as a variant have an oblong cross section. In this case, the height 1 of said cross section may be between 6 and 20 microns and the width L may be between 0.2 and 1.5 mm, the thickness e being the same as previously. Moreover, instead of comprising only a core 5 and a surface coating 6, the wires 2 and 3 could have a structure consisting of several superposed layers. FIG. 6 shows an alternative embodiment of said wires 2 and 3, in which an interlayer 8 is interposed between the core S and the surface coating 6. Of course, in this case the interlayer 8 must be made of a metal capable of forming a stable diffusion alloy with the coating 6.

Figure 7A:
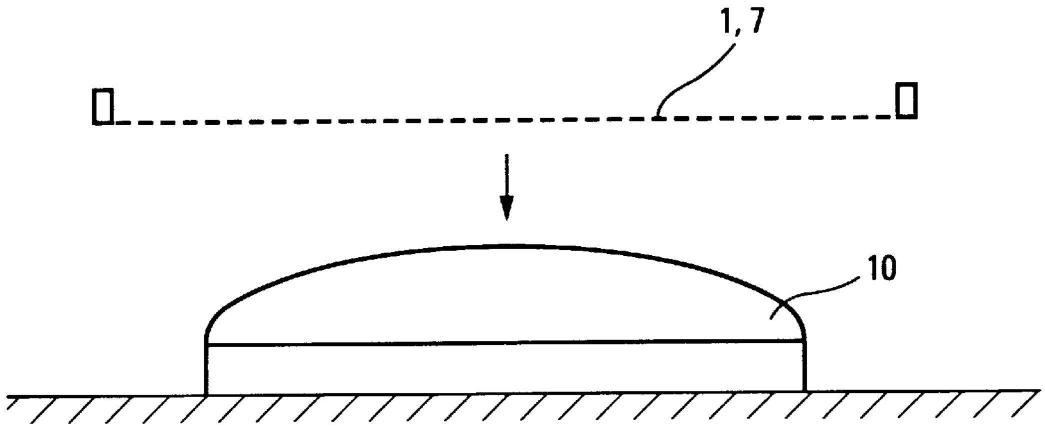
FIGS. 7A to 7F illustrate various phases in the process for producing an antenna reflector according to the present invention.
Figure 7B:
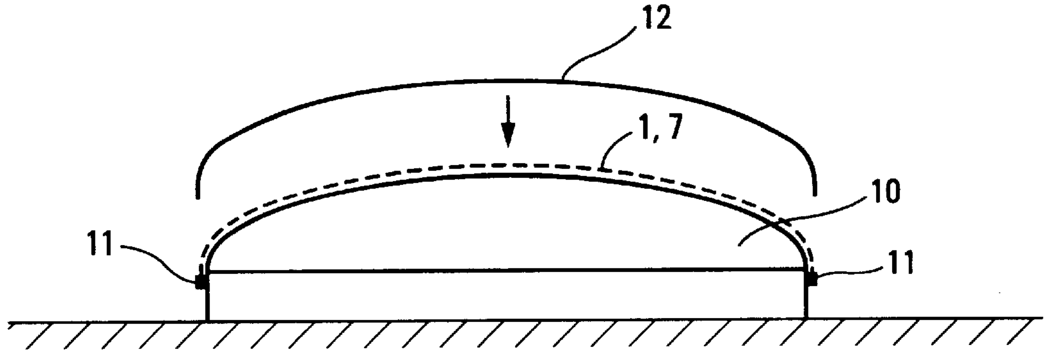
Figure 7C:
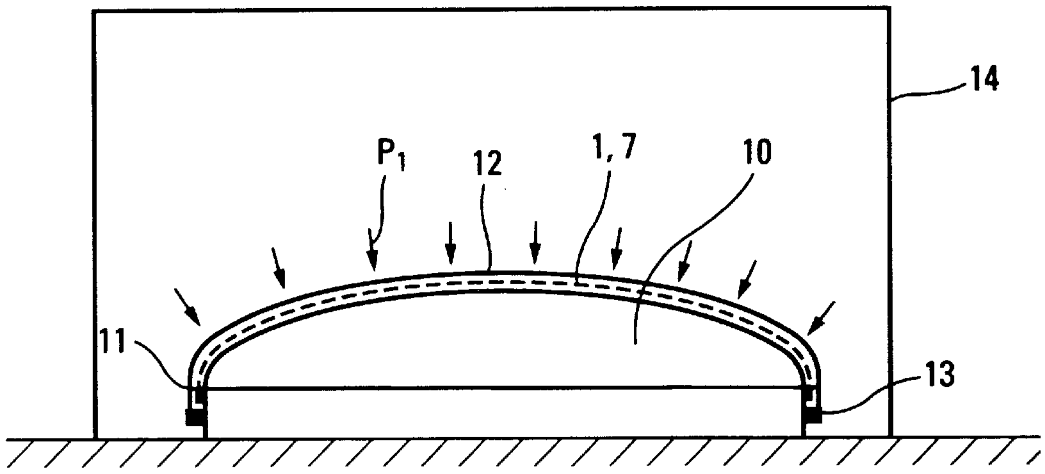
Figure 7D:
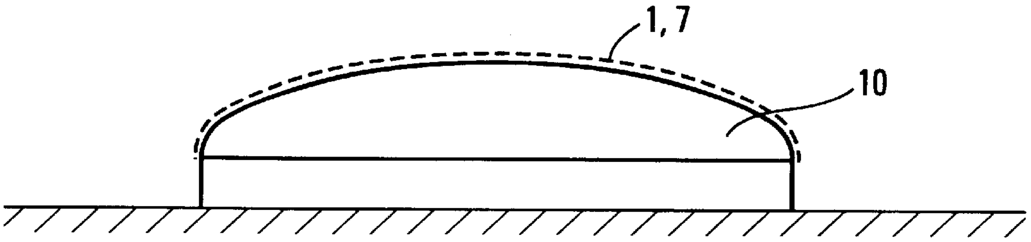
Figure 7E:
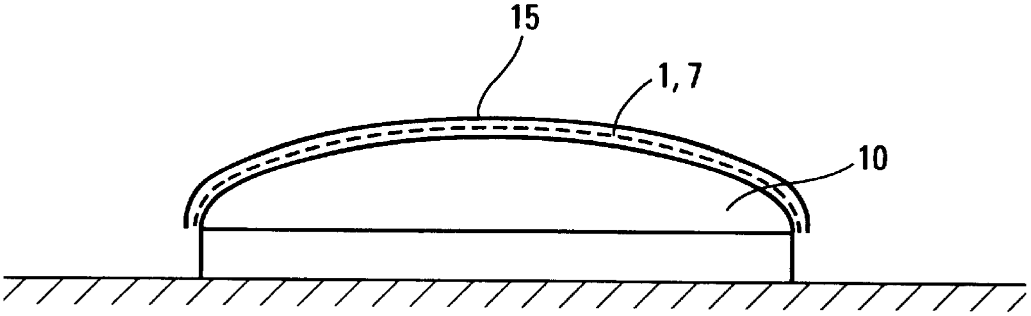
Figure 7F:
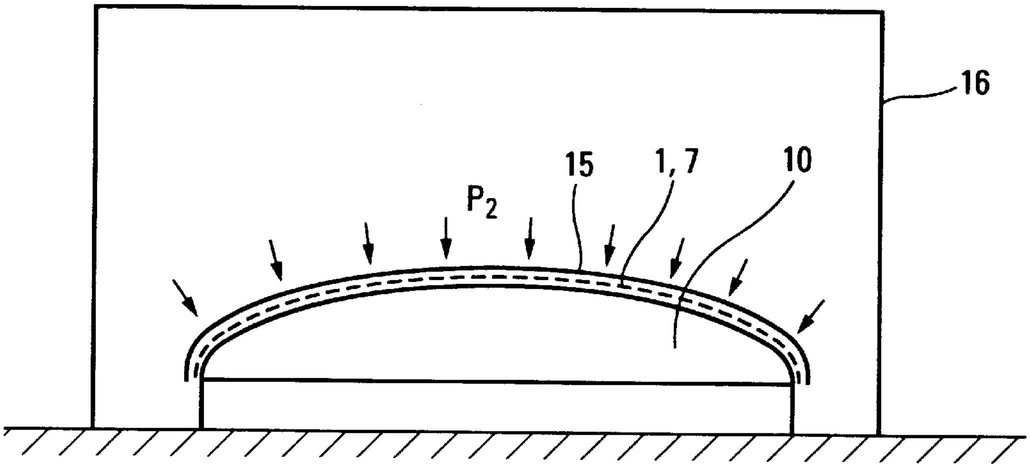

FIGS. 7A to 7F show a mold 10 corresponding to the convex shape of an antenna reflector. To obtain said antenna reflector, the following operations are carried out:

an interlacement 1, 7 of electrically conducting wires 2 and 3 is applied to the mold 10, while stretching said interlacement (FIG. 7A);

said interlacement 1, 7 thus applied to the mold 10 is then fixed peripherally by any desired means 11, for example a bead of mastic (see FIG. 7B);

a skin of caulking 12—produced beforehand on the mold 10—is applied to the interlacement 1, 7 thus fixed to the mold 10, the skin of caulking being fixed by any suitable means 13, for example also by a bead of mastic (FIGS. 7B and 7C);

the assembly comprising the mold 10, the interlacement 1, 7 and the skin of caulking 12 is then introduced into an autoclave 14 in which said assembly is subjected to a temperature rise beyond the melting point of indium, while applying a uniform pressure P1 to it, for example by means of a vacuum bladder (not illustrated) which acts on the skin of caulking 12;

under these conditions, in the manner described above, a copper-indium metal diffusion alloy forms superficially on the surface of the electrically conducting wires 2 and 3 so that the interlacement 1, 7 rigidifies to the shape of the mold 10;

after removing the skin (FIG. 7D), it is then possible to lap, on the convex face of the interlacement 1, 7, a reinforcement 15 of a fiber/curable matrix composite (see FIG. 7E);

after lapping the composite reinforcement 15, it is cured in an autoclave 16 with a pressure P2 applied;

while the reinforcement 15 is curing, the resin fastens the interlacement 1, 7 to said reinforcement 15 and a surface reflecting electromagnetic waves, consisting of said interlacement 1, 7 and of its rear reinforcement 15, is thus obtained.

The temperature rise in the oven 14, resulting in the diffusion soldering of the interlacement 1, 7, may be at 0.1° C. per minute from room temperature up to the desired temperature for the diffusion, this being compatible with the temperature at which the subsequent curing of the resin of the reinforcement 15 takes place.

The interlacement 1, 7 is maintained at this desired diffusion temperature for a time appropriate to the diffusion soldering, after which the interlacement may cool down naturally.

What is claimed:

1. A process for producing a rigid surface reflecting electromagnetic waves, comprising:

producing a flexible interlacement of electrically conducting wires, said wires comprising a core metal and being coated with a filler metal, said filler metal having a melting point below that of said core metal of said wires, both said filler metal and said core metal being able to diffuse mutually into each other when heated to a temperature at least equal to the melting point of said filler metal in order to form a stable metal diffusion alloy, the melting temperature of said stable metal diffusion alloy being above the melting point of said filler metal and increasing toward the melting point of said core metal with the intensity of said diffusion;

shaping said flexible interlacement to a shape desired for said rigid surface reflecting electromagnetic waves; and raising the temperature of said flexible interlacement beyond the melting point of said filler metal in order to form said metal diffusion alloy, thus causing said wires to be fastened together and said interlacement to become rigid to form said rigid surface.

2. The process as claimed in claim 1, wherein said filler metal has a thickness of between 10 ångströms and 1 micron when the cross section of said wires has a dimension at most equal to 20 microns.

3. The process as claimed in claim 1, additionally comprising subjecting said shaped flexible interlacement to pressure when said temperature of said interlacement is being raised.

4. The process as claimed in claim 1, wherein said interlacement is a knit of said wires.

5. The process as claimed in claim 1, wherein said rigid surface is without any holes.

6. The process as claimed in claim 1, wherein said rigid surface includes holes.

7. The process as claimed in claim 1, additionally comprising placing and fastening a reinforcement against a face of said rigid surface.

8. The process as claimed in claim 7, wherein said reinforcement has a fiber-cured-resin matrix composite structure and is fastened to said face of said rigid surface by resin of said matrix composite.

* * * * *